(12) United States Patent
Kamiya et al.

(10) Patent No.: US 7,547,001 B2
(45) Date of Patent: Jun. 16, 2009

(54) SOLENOID VALVE DEVICE INSTALLED IN GAS TANK

(75) Inventors: Tadayoshi Kamiya, Okazaki (JP); Soichi Shirai, Toyohashi (JP); Mikio Asai, Okazaki (JP); Nobuyuki Shirai, Toyohashi (JP); Yoshiyuki Takeuchi, Gamagori (JP); Toshihiko Shima, Okazaki (JP); Hiroaki Suzuki, Nagoya (JP)

(73) Assignees: Toyooki Kogyo Co. Ltd., Aichi (JP); Jtekt Corporation, Osaka (JP)

( * ) Notice: Subject to any disclaimer, the term of this patent is extended or adjusted under 35 U.S.C. 154(b) by 330 days.

(21) Appl. No.: 10/578,033

(22) PCT Filed: Nov. 2, 2004

(86) PCT No.: PCT/JP2004/016273

§ 371 (c)(1),
(2), (4) Date: May 2, 2006

(87) PCT Pub. No.: WO2005/045309

PCT Pub. Date: May 19, 2005

(65) Prior Publication Data

US 2007/0090317 A1 Apr. 26, 2007

(30) Foreign Application Priority Data

Nov. 5, 2003 (JP) ............................. 2003-375737

(51) Int. Cl.
*F16K 31/02* (2006.01)

(52) U.S. Cl. ...................... 251/129.22; 251/129.15; 251/144

(58) Field of Classification Search ............ 251/129.15, 251/129.22, 144

See application file for complete search history.

(56) References Cited

U.S. PATENT DOCUMENTS 4,543,983 A * 10/1985 Pauliukonis ................. 137/356

(Continued)

FOREIGN PATENT DOCUMENTS

JP 7-301359 11/1995

(Continued)

*Primary Examiner*—John K Fristoe, Jr.
(74) *Attorney, Agent, or Firm*—Davis & Bujold, P.L.L.C.

(57) ABSTRACT

In order to obtain a solenoid valve device installed in a gas tank that is small in size and easy to attach to a gas tank, a valve body (8) including a flow passage (a) formed therein to communicate the inside and the outside of a gas tank (1) is inserted to the inside from the outside through a mouth hole (2) of the gas tank (1) and attached to the mouth hole (2). A valve seat (46) is provided in the flow passage (a), and a movable valve element (40) attached to or detached from the valve seat (46) is provided in the valve body (8). A solenoid unit (48) includes a movable core (50) engaged with the valve element (40) and a fixed core (64) facing the movable core (50) to attract the movable core (50) by the energization of a coil (74) and distract the movable core (50) by the non-energization of the coil (74). The solenoid unit (48) is arranged inside a storage hole (16) formed at an end part of the valve body (8) inside the gas tank (1). A cap member (90) is provided to cover the end part of the valve body (8) inside the gas tank (1). An opening (96) formed in an end face of the cap member (90) communicates with the flow passage (a), and a flat plate-like filter member (102) is disposed in the opening (96).

10 Claims, 3 Drawing Sheets

U.S. PATENT DOCUMENTS

| | | |
|---|---|---|
| 5,452,738 A | 9/1995 | Borland et al. |
| 5,458,151 A * | 10/1995 | Wass .......................... 137/613 |
| 5,809,977 A | 9/1998 | Krimmer et al. |

FOREIGN PATENT DOCUMENTS

| | | |
|---|---|---|
| JP | 8-270820 | 10/1996 |
| JP | 10-038124 | 2/1998 |
| JP | 11-36989 | 2/1999 |
| JP | 2003-240148 | 8/2003 |
| WO | WO 96/35052 | 11/1996 |

* cited by examiner

SOLENOID VALVE DEVICE INSTALLED IN GAS TANK

This application is a national stage completion of PCT/JP2004/016273 filed Nov. 2, 2004 which claims priority from Japanese Application Serial No. 2003-375737 filed Nov. 5, 2003.

TECHNICAL FIELD

This invention relates to a solenoid valve device installed in a gas tank to be filled with high pressure gas. Particularly, this invention concerns a solenoid valve device suitable to be installed in a gas tank of fuel cell vehicles to be filled with high pressure hydrogen gas.

BACKGROUND ART

Heretofore, a solenoid valve is provided in a gas tank mounted in an automobile and filled with high pressure gas, for example. The high pressure gas is supplied from the gas tank by opening/closing control of the solenoid valve. As shown in Patent Document 1, this solenoid valve is integrally assembled into a valve body attached to a mouth hole of the gas tank. The solenoid valve is provided at the front end of the valve body and arranged inside the gas tank.

Patent Document 1: Unexamined Japanese Patent Publication No.11-36989.

DISCLOSURE OF THE INVENTION

Problem to be Solved by the Invention

However, such a conventional solenoid valve is inserted into the gas tank from the mouth hole thereof after integrally assembled into the valve body. Therefore, the larger the size of the solenoid valve is, the larger the mouth hole of the gas tank has be formed so that the solenoid valve can be inserted therefrom. Accordingly, the valve body attached to the mouth hole of the gas tank is also enlarged. There are problems that the solenoid valve is increased in size and weight.

One object of the present invention is to provide a solenoid valve device installed in a gas tank, which is small in size and easy to attach to a gas tank.

Means for Solving the Problem

To attain the above object and solve the aforementioned problems, the present invention has taken the following measures. In one aspect of the present invention, a solenoid valve device is installed in a gas tank for filling high pressure gas therein. A movable core is attracted to or distracted from a fixed core by energization or non-energization of a coil so that a valve element is attached to or detached from a valve seat for opening/closing operation. A valve body includes a flow passage formed therein to communicate the inside and the outside of the gas tank. The valve body is inserted to the inside from the outside through a mouth hole of the gas tank and attached to the mouth hole. The valve seat is provided in the flow passage, and a movable valve element attached to or detached from the valve seat is provided in the valve body. A solenoid unit includes the movable core engaged with the valve element and the fixed core facing the movable core to attract the movable core by the energization of the coil and distract the movable core by the non-energization of the coil. The solenoid unit is arranged inside a storage hole formed at an end part of the valve body inside the gas tank. A cap member is provided to cover the end part of the valve body inside the gas tank. An opening formed in an end face of the cap member communicates with the flow passage, and a flat plate-like filter member is disposed in the opening.

In the solenoid valve device for a gas tank of the present invention, the solenoid unit is disposed in the storage hole of the valve body. Also, the flat plate-like filter member is provided at an axial end of the valve body. Therefore, the solenoid valve device can be small in size and easy to attach to a gas tank. If the flow passage is provided along the outer periphery of the valve body, the fixed core can be cooled by high pressure gas.

The flow passage may be provided along the outer periphery of the valve body outside the storage hole.

In another aspect of the present invention, a solenoid valve device is installed in a gas tank for filling high pressure gas therein. A movable core is attracted to or distracted from a fixed core by energization or non-energization of a coil so that a valve element is attached to or detached from a valve seat for opening/closing operation. A valve body includes a flow passage formed therein to communicate the inside and the outside of the gas tank. The valve body is inserted to the inside from the outside through a mouth hole of the gas tank and attached to the mouth hole. The valve seat is provided in the flow passage, and a movable valve element attached to or detached from the valve seat is provided in the valve body. A solenoid unit includes the movable core engaged with the valve element and the fixed core facing the movable core to attract the movable core by the energization of the coil and distract the movable core by the non-energization of the coil. The solenoid unit is arranged inside a storage hole formed at an end part of the valve body inside the gas tank. An opening communicating with the flow passage is formed on an outer peripheral side of the valve body. A ring-like filter member is disposed in the opening.

In the solenoid valve device installed in a gas tank as such, the solenoid unit is disposed in the storage hole of the valve body. Also, the ring-like filter member is provided on the outer peripheral side of the valve body. Therefore, the solenoid valve device can be small in size and easy to attach to a gas tank.

In another further aspect of the present invention, a solenoid valve device is installed in a gas tank for filling high pressure gas therein. A movable core is attracted to or distracted from a fixed core by energization or non-energization of a coil so that a valve element is attached to or detached from a valve seat for opening/closing operation. A valve body includes a flow passage formed therein to communicate the inside and the outside of the gas tank. The valve body is inserted to the inside from the outside through a mouth hole of the gas tank and attached to the mouth hole. The valve seat is provided in the flow passage, and a movable valve element attached to or detached from the valve seat is provided in the valve body. A solenoid unit includes the movable core engaged with the valve element and the fixed core facing the movable core to attract the movable core by the energization of the coil and distract the movable core by the non-energization of the coil. The solenoid unit is arranged inside a storage hole formed at an end part of the valve body inside the gas tank. A rotating direction positioning member is inserted to a groove formed in the valve body and a groove formed in the fixed core. A cutout for inserting a lead connecting the coil to an external power supply is formed in the rotating direction positioning member.

In the solenoid valve device installed in a gas tank as such, the solenoid unit is disposed in the storage hole of the valve body. Also, the rotating direction positioning member is inserted to the grooves of the valve body and the fixed core, and the lead is inserted to the cutout of the rotating direction positioning member. Therefore, the solenoid valve device can be small in size and easy to attach to a gas tank.

In another further aspect of the present invention, a solenoid valve device is installed in a gas tank for filling high pressure gas therein. A movable core is attracted to or distracted from a fixed core by energization or non-energization of a coil so that a valve element is attached to or detached from a valve seat for opening/closing operation. A valve body includes a flow passage formed therein to communicate the inside and the outside of the gas tank. The valve body is inserted to the inside from the outside through a mouth hole of the gas tank and attached to the mouth hole. The valve seat is provided in the flow passage, and a movable valve element attached to or detached from the valve seat is provided in the valve body. A solenoid unit includes the movable core engaged with the valve element and the fixed core facing the movable core to attract the movable core by the energization of the coil and distract the movable core by the non-energization of the coil. The solenoid unit is arranged inside a storage hole formed at an end part of the valve body inside the gas tank. A discharge passage that can discharge the high pressure gas to the outside is formed in the valve body separately from the flow passage. A lead connecting the coil to an external power supply is inserted to the discharge passage.

In the solenoid valve device installed in a gas tank as such, the solenoid unit is disposed in the storage hole of the valve body. Also, the lead is inserted to the discharge passage of the valve body. Therefore, the solenoid valve device can be small in size and easy to attach to a gas tank.

The solenoid unit may be constituted as follows. An insertion hole for inserting the coil is axially bored from one end face of the fixed core. The coil is inserted to the insertion hole and retained by a retention ring attached to the insertion hole. The coil is axially pressed by a resilient member inserted to the insertion hole. Also, the solenoid unit may be constituted as follows. The fixed core stored in the storage hole is retained by a retention ring attached to the storage hole. The fixed core is axially pressed by a resilient member stored in the storage hole. In this manner, the coil or the fixed core can be easily fixed and held by biasing the coil or the fixed core by the resilient member.

BEST MODE FOR CARRYING OUT THE INVENTION

The best mode for carrying out the present invention will be explained hereafter based on the drawings.

Figure 1:
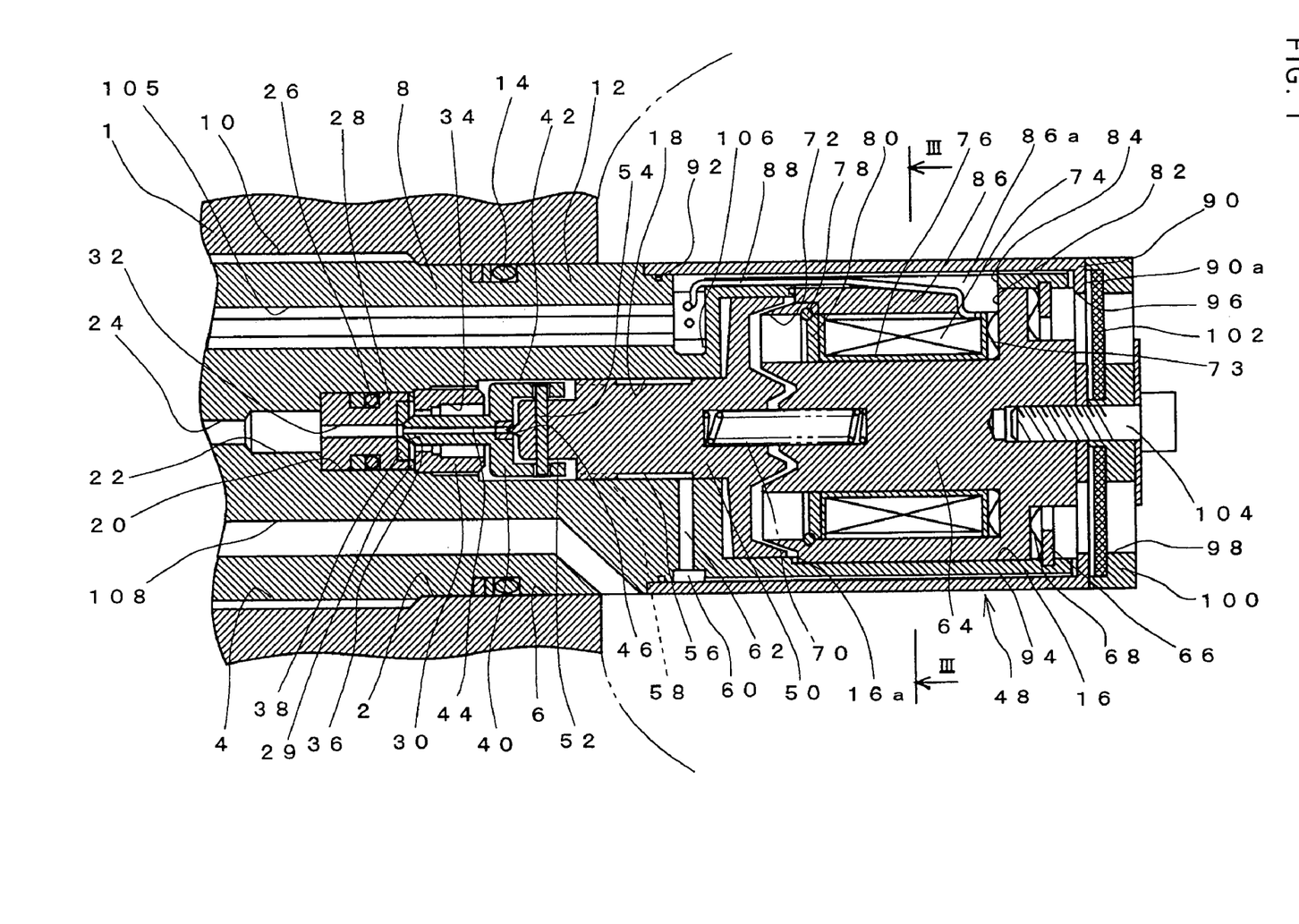
FIG. 1 is a cross sectional view along the axial direction of a solenoid valve device installed in a gas tank according to an embodiment of the present invention.
Figure 2:
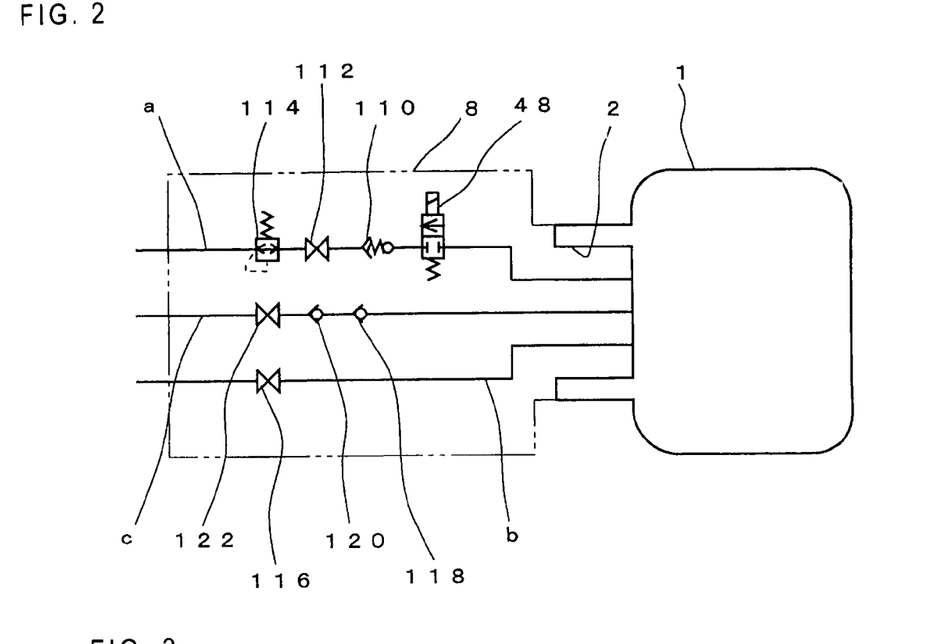
FIG. 2 is a circuit diagram of the solenoid valve device installed in a gas tank according to the embodiment.

As shown in FIGS. 1 and 2, a gas tank 1 is filled with high pressure hydrogen gas in the present embodiment. A mouth hole 2 is formed in the gas tank 1. The mouth hole 2 is piercingly formed so as to communicate the inside and the outside of the gas tank 1. A female thread 4 is formed in the mouth hole 2. A straight hole 6 is formed continuous to the female thread 4.

A valve body 8 is inserted to the mouth hole 2 from the outside toward the inside of the gas tank 1. A male screw 10 to be screwed into the female thread 4 and a straight shaft 12 to be fitted into the straight hole 6 are formed in the valve body 8. An O-ring 14 for sealing is fitted into the straight shaft 12.

The valve body 8 is formed to a length such that the front end thereof reaches the inside of the gas tank 1. A storage hole 16 is formed in the valve body 8 in an axial direction from the inner end part of the gas tank 1. A slide hole 18 is formed continuous to the storage hole 16. Furthermore, a valve seat hole 20, a continuous hole 22, and a through hole 24 continuous to the slide hole 18 are formed respectively from the inside toward the outside of the gas tank 1 in the axial direction.

An insertion member 28 sealed with an O-ring 26 is fitted into the valve seat hole 20. A lock member 30 is screwed into the valve seat hole 20 so that the insertion member 28 is fixed to the valve seat hole 20 via a washer member 29. A communication hole 32 is formed in the insertion member 28, and a through hole 34 is formed in the lock member 30. The slide hole 18 and the communication hole 22 communicate with each other.

A valve seat member 38 with a valve seat 36 is fitted to the insertion member 28. The communication hole 32 and the through hole 34 communicate via the valve seat 36. A valve element 40 is movably inserted into the slide hole 18 with a space 42 therebetween. The valve element 40 is designed to move in the slide hole 18 to be attached to or detached from the valve seat 36. A small diameter hole 44 is piercingly formed in the center of the valve element 40. The storage hole 16 side of the small diameter hole 44 communicates with the slide hole 18 via a valve seat 46.

A solenoid unit 48 is disposed inside the storage hole 16. The solenoid unit 48 includes a movable core 50 that is movably inserted to the slide hole 18. The front end of the movable core 50 is inserted to the valve element 40 with a space 52 therebetween. The front end of the movable core 50 is designed to attach to the valve seat 46 so as to interrupt communication between the small diameter hole 44 and the slide hole 18. Also, the movable core 50 and the valve element 40 are locked by a radially inserted pin 54. This pin 54 is fitted to the movable core 50 leaving no space therebetween. There is a space formed between the valve element 40 and the pin 54.

An annular groove 56 is formed on the outer periphery of the movable core 50 inserted to the slide hole 18. A communication groove 58 continuous to the annular groove 56 is formed in an axial direction. In relation to the annular groove 56, an annular groove 60 is formed on the outer periphery of the valve body 8. A through hole 62 that communicates the annular groove 60 and the annular groove 56 is bored on the outer periphery of the valve body 8.

The solenoid unit 48 further includes a fixed core 64 facing the movable core 50. The fixed core 64 is inserted to abut on a step 16a of the storage hole 16. A retention ring 66 is attached to the storage hole 16 on the end side of the valve body 8. A resilient member 68 is placed between the fixed core 64 and the retention ring 66. In the present embodiment, a wave-formed clip plate is used for the resilient member 68. Due to a resilient force of the resilient member 68, the fixed core 64 is pressed against the step 16a and securely held.

A coil spring 70 is disposed between the movable core 50 and the fixed core 64. The coil spring 70 is designed such that the movable core 50 is moved to rest on the valve seat 46 by a biasing force of the coil spring 70. A ring-like insertion hole 72 is formed in the fixed core 64 in an axial direction from the side of the movable core 50. A resilient member 73 and a coil 74 are inserted to the insertion hole 72. In the present embodiment, a wave-formed clip plate is used as the resilient member 73. The coil 74 is a known coil made of a wire wound around a bobbin 76. A retention ring 78 is attached to the insertion hole 72 on the end side of the movable core 50. A lock member 80 is placed between the retention ring 78 and the coil 74. The coil 74 is pressed against the retention ring 78 via the lock member 80 and securely held by a biasing force of the resilient member 73.

Figure 3:
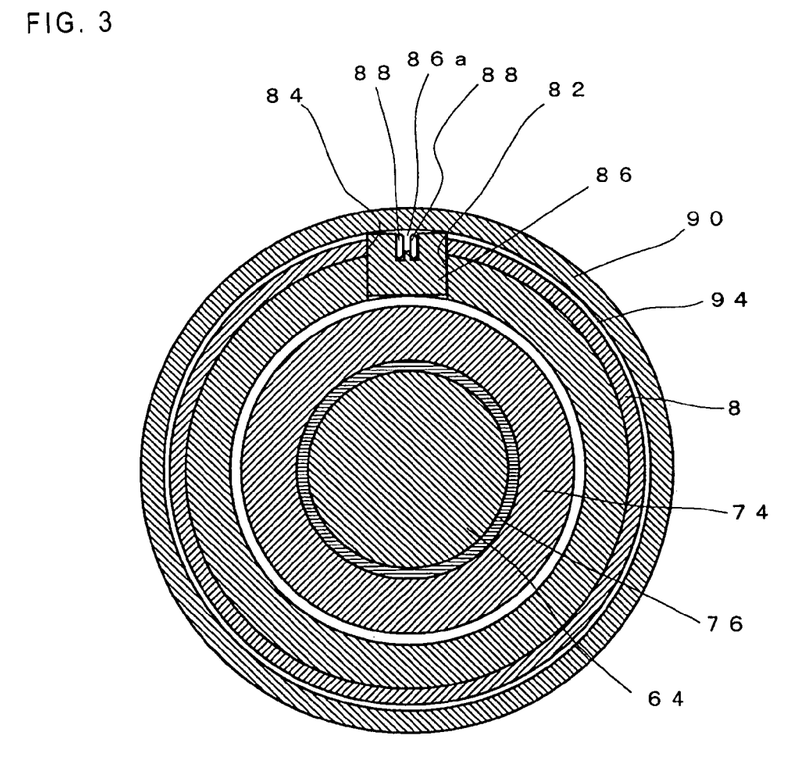
FIG. 3 is an enlarged cross sectional view taken along a line III-III of FIG. 1.

A groove 82 communicating with the insertion hole 72 is formed on the outer periphery of the fixed core 64. In relation to the groove 82, a groove 84 that communicates with the storage hole 16 is formed in the valve body 8. A rotating direction positioning member 86 is inserted to the groves 82, 84 so that the valve body 8 and the fixed core 64 do not rotate relative to each other. A cutout 86a is formed in the rotating direction positioning member 86. A lead 88 of the coil 74 passes through the cutout 86a and is pulled out to the groove 84.

The end part of the valve body 8 protruding to the inside of the gas tank 1 is covered by a cap member 90. The cap member 90 is formed to a length to cover the annular groove 60. The front end of the cap member 90 is sealed by an O-ring 92 attached to the valve body 8. A space 94 is formed between the outer periphery of the valve body 8 and the inner periphery of the cap member 90. The space 94 communicates with the annular groove 60. The outer diameter of the valve body 8 is made small such that the outer diameter of the cap member 90 is the same as or smaller than the outer diameter of the straight shaft 12 of the valve body 8. The cap member 90 is attached to the outer periphery of the valve body 8.

A plurality of openings 96 are bored in an end face 90a in the axial direction of the cap member 90. The openings 96 are designed to communicate with the space 94. A disc-like press member 100 having an opening 98 formed coaxially to the openings 96 is placed on the end face 90a.

A flat plate-like filter member 102 is held between the end face 90a of the cap member 90 and the press member 100.

A bolt 104 that penetrates the cap member 90, the press member 100, and the filter member 102 is screwed into the fixed core 64 so that the cap member 90, the press member 100, and the filter member 102 are secured to the fixed core 64. The filter member 102 can seize and hold a foreign body mixed in the high pressure gas filled in the gas tank 1.

In the present embodiment, a flow passage a is formed of the through hole 24, the continuous hole 22, the communication hole 32, the through hole 34, the slide hole 18, the communication groove 58, the annular groove 56, the through hole 62, the annular groove 60, the space 94, and the openings 96, 98. A discharge hole 105 as a discharge passage b is formed in the valve body 8 separately from this flow passage a. The discharge hole 105 is formed from the outside toward the inside of the gas tank 1. The front end inside the gas tank 1 communicates with a dent 106 formed at the end of the groove 84. The aforementioned lead 88 passes through the groove 84 to be pulled into the dent 106. The lead 88 is further inserted into the discharge hole 105 so as to connect a not shown external power supply outside the gas tank 1.

A supply hole 108 as a supply passage c is formed in the valve body 8 separately from the flow passage a and the discharge passage b. The supply hole 108 is open to the side face of the valve body 8 inside the gas tank 1 and communicates with the inside of the gas tank 1. In the present embodiment, as shown in FIG. 2, an excess flow stop valve 110, an opening/closing valve 112 that is always open, and a pressure reducing valve 114 are disposed in the flow passage a. An opening/closing valve 116 that is always closed is disposed in the discharge passage b. Check valves 118, 120 and an opening/closing valve 122 that is always open are disposed in the supply passage c.

The operation of the solenoid valve device provided in the aforementioned gas tank of the present embodiment will be explained hereinafter.

Firstly, high pressure hydrogen gas is filled into the gas tank 1 via the opening/closing valve 122, the check valves 120, 118, and the supply hole 108. When the coil 74 connected to the external power supply via the lead 88 is energized as the vehicle is driven, the fixed core 64 is energized and attracts the movable core 50. The movable core 50 moves in the slide hole 18, and the front end of the movable core 50 is separated from the valve seat 46. As a result, the high pressure hydrogen gas flows into the communication hole 32 via the opening 98, the filter member 102, the opening 96, the space 94, the annular groove 60, the through hole 62, the annular groove 56, the communication groove 58, the slide hole 18, the valve seat 46, and the small diameter hole 44.

As the pressure in the communication hole 32 is raised, the movable core 50 is further moved and displaces the valve element 40 via the pin 54 to separate the valve element 40 from the valve seat 36. As a result, the through hole 34 and the communication hole 32 communicate via the valve seat 36. The opening 98, the filter member 102, the opening 96, the space 94, the annular groove 60, the through hole 62, the annular groove 56, the communication groove 58, the slide hole 18, the space 42, the through hole 34, the valve seat 36, the communication hole 32, the continuous hole 22, and the through hole 24 all communicate to flow the high pressure hydrogen gas out of the gas tank 1.

When high pressure hydrogen gas passes through the filter member 102, a foreign body is caught and held to supply clean high pressure hydrogen gas. The flat plate-like filter member 102 is attached to the end face 90a of the cap member 90 to provide a compact configuration. Therefore, when the valve body 8 incorporating the solenoid unit 48 is inserted into the mouth hole 2, the filter member 102 does not interfere, and assembling is easy. Also, when the high pressure hydrogen gas passes through the space 94, the fixed core 64 is cooled via the valve body 8. As the space 94 is taken as the flow passage a, a cross sectional area of the flow passage a can be large. The outer shape of the solenoid valve device can be compact.

On the other hand, the attraction of the movable core 50 by the fixed core 64 is cancelled by non-energization of the coil 74. The movable core 50 moves in the slide hole 18 due to the biasing force of the coil spring 70. When the front end of the movable core 50 rests on the valve seat 46, the movable core 50 pushes the valve element 40 to let the valve element 40 rest on the valve seat 36. As a result, the communication among the communication hole 32, the through hole 34, and the small diameter hole 44 is interrupted to stop the flow of the high pressure hydrogen gas.

The lead 88 of the coil 74 is inserted to the cutout 86a of the rotating direction positioning member 86 controlling relative rotation of the valve body 8 and the fixed core 64. Therefore, the lead 88 can be compactly arranged without largely protruding to the outer periphery of the valve body 8. Therefore, the device can be small in size, and the insertion of the valve body 8 into the mouth hole 2 can be easy. Furthermore, since the lead 88 is inserted to the discharge passage b of the valve body 8, there is no need to separately form a hole for pulling the lead 88 out of the gas tank 1. The valve body 8 can be made small and the insertion to the mouth hole 2 is easy. In the present embodiment, the valve element 40 and the movable core 50 are separately formed to provide a pilot type valve.

However, the present embodiment can be exercised even if the valve element 40 and the movable core 50 are integrally formed.

Figure 4:
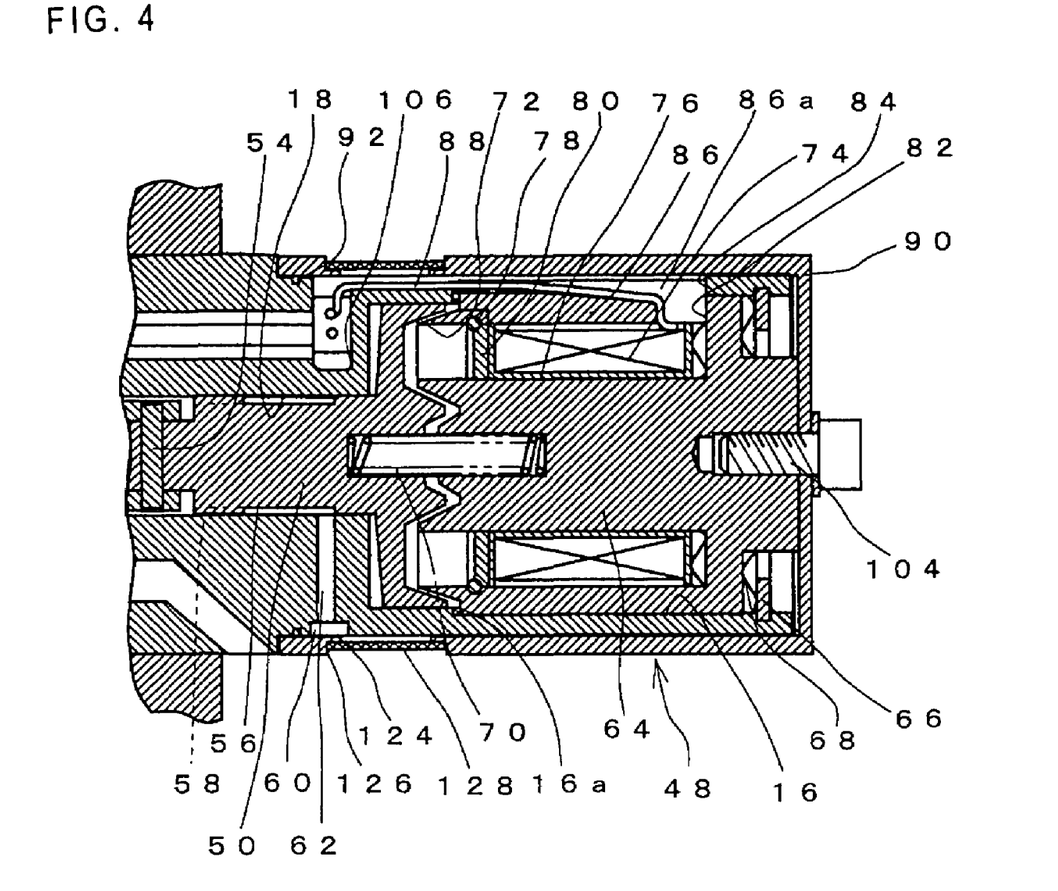
FIG. 4 is a cross sectional view of a main part of a solenoid valve device installed in a gas tank according to another embodiment of the present invention.

From now on, a second embodiment different from the aforementioned embodiment will be explained by way of FIG. 4. The same reference numbers are given to the same components as in the aforementioned embodiment. Descriptions for the same components are not repeated.

In the second embodiment, in relation to the annular groove 60, a plurality of openings 124 communicating with the annular groove 60 are formed on the cylindrical outer periphery of the cap member 90. An annular groove 126 is formed on the outer periphery of the cap member 90 so as to connect the plurality of openings 124. A ring-like filter member 128 is attached to the annular groove 126.

The filter member 128 is formed so as not to protrude from the outer periphery of the cap member 90. Therefore, when assembled through the mouth hole 2, the filter member 128 does not interfere and assembling can be easy.

The present invention is not limited to the above embodiments, and other modifications and variations may be possible without departing from the scope of the present invention.

INDUSTRIAL AVAILABILITY

According to the present invention, a solenoid valve device installed in a gas tank can be obtained which is small in size and easy to attach to a gas tank. The solenoid valve device is available to a gas tank of fuel cell vehicles to be filled with high pressure hydrogen gas.

The invention claimed is:

1. A solenoid valve device installed in a gas tank in which the solenoid valve device is provided in a gas tank for filling high pressure gas therein, and a movable core is attracted to or distracted from a fixed core by one of energization or non-energization of a coil so that a valve element is attached to or detached from a valve seat for opening/closing operation;

the solenoid valve device comprising:

a valve body that includes a flow passage formed therein to communicate an inside and an outside of the gas tank, the valve body being inserted to the inside from the outside through a mouth hole of the gas tank and attached to the mouth hole, the valve seat being provided in the flow passage, and the movable valve element attached to or detached from the valve seat being provided in the valve body;

a solenoid unit that includes the movable core engaged with the valve element and the fixed core facing the movable core to attract the movable core by the energization of the coil and distract the movable core by the non-energization of the coil, the solenoid unit being arranged inside a storage hole formed at an end part of the valve body inside the gas tank;

a cap member being provided to cover the end part of the valve body inside the gas tank, an opening formed in an end face of the cap member communicating with the flow passage, and a flat plate-like filter member being disposed in the opening.

the solenoid unit is constituted such that the fixed core stored in the storage hole is retained by a retention ring attached to the storage hole, and the fixed core is axially pressed by a resilient member stored in the storage hole.

2. The solenoid valve device installed in a gas tank according to claim 1, wherein the flow passage is provided along an outer periphery of the valve body outside the storage hole.

3. The solenoid valve device installed in a gas tank according to claim 2, wherein the solenoid unit is constituted such that an insertion hole for inserting the coil is axially bored from one end face of the fixed core, the coil is inserted to the insertion hole and retained by a retention ring attached to the insertion hole, and the coil is axially pressed by a resilient member inserted to the insertion hole.

4. The solenoid valve device installed in a gas tank according to claim 1, wherein the solenoid unit is constituted such that an insertion hole for inserting the coil is axially bored from one end face of the fixed core, the coil is inserted to the insertion hole and retained by a retention ring attached to the insertion hole, and the coil is axially pressed by a resilient member inserted to the insertion hole.

5. A solenoid valve device installed in a gas tank in which the solenoid valve device is provided in a gas tank for filling high pressure gas therein, and a movable core is attracted to or distracted from a fixed core by one of energization or non-energization of a coil so that a valve element is attached to or detached from a valve seat for opening/closing operation;

the solenoid valve device comprising:

a valve body that includes a flow passage formed therein to communicate an inside and an outside of the gas tank, the valve body being inserted to the inside from the outside through a mouth hole of the gas tank and attached to the mouth hole, the valve seat being provided in the flow passage, and the movable valve element attached to or detached from the valve seat being provided in the valve body;

a solenoid unit that includes the movable core engaged with the valve element and the fixed core facing the movable core to attract the movable core by the energization of the coil and distract the movable core by the non-energization of the coil, the solenoid unit being arranged inside a storage hole formed at an end part of the valve body inside the gas tank, and an opening communicating with the flow passage being formed on an outer peripheral side of the valve body, and a ring-like filter member being disposed in the opening, and the solenoid unit is constituted such that the fixed core stored in the storage hole is restrained by a retention ring attached to the storage hole, and the fixed core is axially pressed by a resilient member stored in the storage hole.

6. The solenoid valve device installed in a gas tank according to claim 5, wherein the solenoid unit is constituted such that an insertion hole for inserting the coil is axially bored from one end face of the fixed core, the coil is inserted to the insertion hole and retained by a retention ring attached to the insertion hole, and the coil is axially pressed by a resilient member inserted to the insertion hole.

7. A solenoid valve device installed in a gas tank in which the solenoid valve device is provided in a gas tank for filling high pressure gas therein, and a movable core is attracted to or distracted from a fixed core by one of energization or non-energization of a coil so that a valve element is attached to or detached from a valve seat for opening/closing operation;

the solenoid valve device comprising:

a valve body that includes a flow passage formed therein to communicate an inside and an outside of the gas tank, the valve body being inserted to the inside from the outside through a mouth hole of the gas tank and attached to the mouth hole, the valve seat being provided in the flow passage, and the movable valve element attached to or detached from the valve seat being provided in the valve body;

a solenoid unit that includes the movable core engaged with the valve element and the fixed core facing the movable core to attract the movable core by the energization of the coil and distract the movable core by the non-energization of the coil, the solenoid unit being arranged inside a storage hole formed at an end part of the valve body inside the gas tank; and a rotating direction positioning member being inserted to a groove formed in the valve body and a groove formed in the fixed core, and a cutout for inserting a lead connecting the coil to an external power supply being formed in the rotating direction positioning member.

8. The solenoid valve device installed in a gas tank according to claim 1, wherein the solenoid unit is constituted such that an insertion hole for inserting the coil is axially bored from one end face of the fixed core, the coil is inserted to the insertion hole and retained by a retention ring attached to the insertion hole, and the coil is axially pressed by a resilient member inserted to the insertion hole.

9. The solenoid valve device installed in a gas tank according to claim 7, wherein the solenoid unit is constituted such that the fixed core stored in the storage hole is retained by a retention ring attached to the storage hole, and the fixed core is axially pressed by a resilient member stored in the storage hole.

10. A solenoid valve device installed in a gas tank in which the solenoid valve device is provided in a gas tank for filling high pressure gas therein, and a movable core is attracted to or distracted from a fixed core by one of energization or non-energization of a coil so that a valve element is attached to or detached from a valve seat for opening/closing operation;

the solenoid valve device comprising:

a valve body that includes a flow passage formed therein to communicate an inside and an outside of the gas tank, the valve body being inserted to the inside from the outside through a mouth hole of the gas tank and attached to the mouth hole, the valve seat being provided in the flow passage, and the movable valve element attached to or detached from the valve seat being provided in the valve body;

a solenoid unit that includes the movable core engaged with the valve element and the fixed core facing the movable core to attract the movable core by the energization of the coil and distract the movable core by the non-energization of the coil, the solenoid unit being arranged inside a storage hole formed at an end part of the valve body inside the gas tank; and a discharge passage that can discharge the high pressure gas to an outside being formed in the valve body separately from the flow passage, and a lead connecting the coil to an external power supply being inserted to the discharge passage; and wherein the solenoid unit is constituted such that the fixed core stored in the storage hole is retained by a retention ring attached to the storage hole, and the fixed core is axially pressed by a resilient member stored in the storage hole.

* * * * *

UNITED STATES PATENT AND TRADEMARK OFFICE
CERTIFICATE OF CORRECTION

PATENT NO. : 7,547,001 B2
APPLICATION NO. : 10/578033
DATED : June 16, 2009
INVENTOR(S) : Tadayoshi Kamiya et al.

It is certified that error appears in the above-identified patent and that said Letters Patent is hereby corrected as shown below:

In claim 8, (column 9, line 14)

replace "to claim 1" with "to claim 7".

Signed and Sealed this

Eighteenth Day of August, 2009

David J. Kappos
*Director of the United States Patent and Trademark Office*